United States Patent
Dorce

(10) Patent No.: US 10,470,482 B1
(45) Date of Patent: Nov. 12, 2019

(54) LORETTA'S EXOTIC BIRD HAND FEEDING FORMULA

(71) Applicant: Loretta Dorce, Golden Valley, AZ (US)

(72) Inventor: Loretta Dorce, Golden Valley, AZ (US)

(*) Notice: Subject to any disclaimer, the term of this patent is extended or adjusted under 35 U.S.C. 154(b) by 450 days.

(21) Appl. No.: 15/394,781

(22) Filed: Dec. 29, 2016

(51) Int. Cl.
A23K 50/70 (2016.01)
A23K 10/30 (2016.01)
A23K 40/00 (2016.01)

(52) U.S. Cl.
CPC .............. *A23K 50/70* (2016.05); *A23K 10/30* (2016.05); *A23K 40/00* (2016.05)

(58) Field of Classification Search
CPC ................................ A23K 50/70; A23K 50/75
See application file for complete search history.

(56) References Cited

U.S. PATENT DOCUMENTS

2016/0213028 A1* 7/2016 Faccio .................... A23K 20/30
2016/0219906 A1* 8/2016 Yu ........................ H04L 63/123

OTHER PUBLICATIONS

Parrot Pizza, available at: https://web.archive.org/web/20160501000000*/https://parrotfunzone.com/feathered-fun/activities/yummy-bird-recipes/parrot-pizza; accessed on Jun. 23, 2019; published on Sep. 2, 2016. (Year: 2016).*
Recipe. (2007). In R.E. Allen (Ed.), The penguin English Dictionary. (3rd ed.). [Online]. London: Penguin. Available at: https://search.credoreference.com/content/entry/penguineng/recipe/0?institutionId=743; Accessed Jun. 24, 2019. (Year: 2007).*
Recipe. (2016). In Editors of the American Heritage Dictionaries (Ed.), The American Heritage (R) dictionary of the English language. (6th ed.). Available at: https://search.credoreference.com/content/entry/hmdictenglang/recipe/0?institutionId=743; Accessed Jun. 24, 2019. (Year: 2016).*
Recipe. (2014). In Collins Dictionaries (Ed.), Collins English Dictionary. (12th ed.). [Online]. London: Collins. Available at: https://search.credoreference.com/content/entry/hcengdict/recipe/0?institutionId=743; Accessed Jun. 24, 2019. (Year: 2014).*
Birds N Ways Recipe Exchange, Available at: http://www.birdsnways.com/data/recipes.txt; accessed on Jun. 24, 2019; published 1999. (Year: 1999).*

* cited by examiner

Primary Examiner — Walter A Moore

(57) ABSTRACT

A recipe for bird food for hand feeding young birds comprising a plurality of nutrients having high protein liquid bird feeding formula. When this formula is made it will be liquid, then it will need to be freeze dried, then marketed.

1 Claim, 2 Drawing Sheets 100 102

| LORETTA'S EXOTIC BIRD HAND FEEDING FORMULA | | |
|---|---|---|
| # | INGREDIENTS | QUANTITY |
| i. | green beans 110 | 4 oz. |
| ii. | peas 116 | 4 oz. |
| iii. | garden vegetables 122 | 4 oz. |
| iv. | carrots 128 | 4 oz. |
| v. | applesauce 134 | 4 oz. |
| vi. | peanut butter 140 | 1 cup |
| vii. | egg yolks 146 | 4 |
| viii. | water 152 | 2 cups |
| ix. | sunflower seeds 158 | 2 cups |
| x. | dry rice baby cereal 164 | 1 cup |
| xi. | oatmeal 170 | 1 cup |
| xii. | cream of wheat 176 | 2 cups |

| METHOD OF MAKING<br>Loretta's Exotic Bird Hand Feeding Formula ||
|---|---|
| i. | place 4 ounces of strained green beans in a pan; |
| ii. | place 4 ounces of strained peas in said pan; |
| iii. | place 4 ounces of strained garden vegetables in said pan; |
| iv. | place 4 ounces of strained carrots in said pan; |
| v. | place 4 ounces of strained applesauce in said pan; |
| vi. | place 1 cup of creamy peanut butter in a said blender; |
| vii. | place 4 egg yolks from hard boiled eggs in said blender; |
| viii. | place 2 cups of water in said blender; |
| ix. | blend said egg yolks and water in said blender; |
| x. | place said blended egg yolks and water into said pan; |
| xi. | mix the contents of said pan; |
| xii. | place 2 cups of shelled sunflower seeds in a said blender; |
| xiii. | place 2 cups of water in said blender; |
| xiv. | blend said sunflower seeds and water in said blender; |
| xv. | place said blended sunflower seeds and water into said pan; |
| xvi. | mix the contents of said pan; |
| xvii. | place 1 cup of dry rice baby cereal in a said blender; |
| xviii. | place 1 cup of water in said blender; |
| xix. | blend said dry rice baby cereal and water in said blender; |
| xx. | place said dry rice baby cereal and water into said pan; |
| xxi. | mix the contents of said pan; |
| xxii. | place 1 cup of cooked oatmeal in a said blender; |
| xxiii. | place 1 cup of water in said blender; |
| xxiv. | blend said oatmeal and water in said blender; |
| xxv. | place said oatmeal and water into said pan; |
| xxvi. | mix the contents of said pan; |
| xxvii. | place 2 cups of cooked cream of wheat in a said blender; |
| xxviii. | place 1 cup of water in said blender; |
| xxix. | blend said cream of wheat and water in said blender; |
| xxx. | place said cream of wheat and water into said pan; |
| xxxi. | mix the contents of said pan; |
| xxxii. | heat the contents of said pan while stirring; |
| xxxiii. | cook for 6 minutes; |
| xxxiv. | let contents cool to room temperature; and then |
| xxxv. | place contents in container & freeze. |

FIG. 2

LORETTA'S EXOTIC BIRD HAND FEEDING FORMULA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of bird feeding formulas and more specifically relates to a recipe for bird food for hand feeding young birds.

2. Description of the Related Art

There are four bird types including Nectar eating birds, insect eating, carnivores as well as fruit and seed eating which all obtain their own needs and varieties of food content. Nectar eating birds go from one flower to another pollinating each flower as it journeys through a garden, insect eating birds do just that and troll through the gardens and backyards moving through mulch and soil to find worms and various other insects. Carnivores consist of meat eating birds, these birds are able to find small wild life depending on the size, birds such as eagles eat larger meat left behind by other predators. Lastly, seed and fruit eating birds find fruit trees scatter across properties and find the nutrition through these. When you hand feed baby birds or very young birds, you need to feed them every two hours around the clock. As they grow you can spread the feeding time out to every 3 or 4 hours, and just keep spreading the time between feedings as they grow. In feed stores, pet stores, & pet catalogs bird formulas that are available don't give the birds the high protein that is needed for a healthy bird. A need exists for a healthy nutritious bird formula to hand feed birds.

Various attempts have been made to solve the problems which may be found in the related art but have thus far been unsuccessful. None of the above inventions and patents, taken either singly or in combination, is seen to describe the invention as claimed.

Ideally, a recipe for bird food for hand feeding young birds should be user-friendly and safe in-use and, yet may operate reliably and be manufactured at a modest expense. Thus, a need exists for a recipe for bird food for feeding young birds comprising a plurality of nutrients for a healthy bird and to avoid the above mentioned problems.

BRIEF SUMMARY OF THE INVENTION

In view of the foregoing disadvantages inherent in the known bird feeding formulas art, the present invention provides a novel recipe for bird food for feeding young birds (Entitled Loretta's Exotic Bird Hand Feeding Formula). The general purpose of the present invention, which will be described subsequently in greater detail is to provide a recipe for bird food for hand feeding young birds comprising a plurality of nutrients having a high protein liquid bird feeding formula. When this formula is made it will be liquid, then it will need to be freeze dried, then marketed.

A recipe for bird food for hand feeding young birds comprising the steps of: step one placing 4 ounces of strained green beans in a pan; step two place 4 ounces of strained peas in said pan; step three place 4 ounces of strained garden vegetables in said pan; step four place 4 ounces of strained carrots in said pan; step five place 4 ounces of strained applesauce in said pan; step six place 1 cup of peanut butter in a blender; step seven place 4 hard boiled egg yolks in said blender; step eight place 2 cups of water in said blender; step nine blend said egg yolks and water in said blender; step ten place said blended egg yolks and water into said pan; step eleven mix the contents of said pan; step twelve place 2 cups of shelled sunflower seeds in a blender; step thirteen place 2 cups of water in said blender; step fourteen blend said sunflower seeds and water in said blender; step fifteen place said blended shelled sunflower seeds and water into said pan; step sixteen mix the contents of said pan; step seventeen place 1 cup of dry rice baby cereal in a blender; step eighteen place 1 cup of water in said blender; step nineteen blend said dry rice baby cereal and water in said blender; step twenty place said dry rice baby cereal and water into said pan; step twenty-one mix the contents of said pan; step twenty-two place 1 cup of cooked oatmeal in a blender; step twenty-three place 1 cup of water in said blender; step twenty-four blend said cooked oatmeal and water in said blender; step twenty-five place said cooked oatmeal and water into said pan; step twenty-six mix the contents of said pan; step twenty-seven place 2 cups of cooked cream of wheat in a blender; step twenty-eight place 1 cup of water in said blender; step twenty-nine blend said cooked cream of wheat and water in said blender; step thirty place said cooked cream of wheat and water into said pan; step thirty-one mix the contents of said pan; step thirty-two heat the contents of said pan while stirring; step thirty-three cook for 6 minutes & keep stirring so it doesn't lump; step thirty-four let contents cool to room temperature; and then step thirty-five place the contents in containers & freeze in 4 day feeding servings. Do not feed after 4 days. Keep formula you are feeding refrigerated.

The peanut butter is creamy peanut butter. The egg yolks are from hard boiled eggs. The sunflower seeds are raw shelled sunflower seeds. The oatmeal is cooked oatmeal. The cream of wheat is cooked cream of wheat. The green beans are strained. The peas are strained. The garden vegetables are strained. The carrots are strained. The applesauce is strained.

The present invention holds significant improvements and serves as a recipe for bird food for hand feeding young birds. This hand feeding formula is high protein, all natural, & is multipurpose. Adult birds love this formula. Keep them on one feeding a day as a treat & they will stay bonded to you. If a bird gets hurt they do not eat like they should & usually die. Hand feed them this formula & keep them built up while they heal. If a bird gets sick they will not eat or very little & die in a short time. Hand feed this formula to keep them strong so they can get better. You can also put their medicines in this formula so they will take it easily & you don't have to fight them. A small package called an "Emergency Kit" will be great for this.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, exotic bird hand feeding formula, constructed and operative according to the teachings of the present invention.

FIG. 2 is a chart illustrating the steps for producing the exotic bird hand feeding formula according to an embodiment of the present invention of FIG. 1.

The various embodiments of the present invention will hereinafter be described in conjunction with the appended drawings, wherein like designations denote like elements.

DETAILED DESCRIPTION

Figure 1:
FIG. 1 shows a table illustrating the ingredient composition for an exotic bird hand feeding formula according to an embodiment of the present invention.

As discussed above, embodiments of the present invention relate to bird feeding formulas and more particularly to a for bird food for hand feeding young birds (Entitled Loretta's Exotic Bird Hand Feeding Formula) comprising a plurality of nutrients for a healthy bird.

Referring to the drawings by numerals of reference there is shown in FIG. 1, shows a table illustrating the ingredient composition for an exotic bird hand feeding formula according to an embodiment of the present invention.

Recipe 100 for bird formula food 102 for hand feeding young birds is a nutritious bird feed having especially valuable qualities for growing birds and for high nutrition for several types of very young birds. The feed has considerable value for grown birds as well, as it eliminates much of the nutritional based sicknesses that are common to birds. The steps to produce and the ingredients used can be easily acquired and cooked into the desired consistency and composition in a relatively short period of time. Recipe 100 for bird formula food 102 for hand feeding young birds includes strained green beans 110, strained peas 116, strained garden vegetables 122, strained carrots, 128, strained applesauce 134, peanut butter 140, hard boiled egg yolks 146, water 152, shelled sunflower seeds 158, dry rice baby cereal 164, cooked oatmeal 170, and cooked cream of wheat 176.

Referring now to FIG. 2, is a chart illustrating steps 200 (method of making) for producing the exotic bird hand feeding formula according to an embodiment of the present invention of FIG. 1.

A recipe for bird food for feeding young birds comprising the steps of: step one placing 4 ounces of strained green beans in a pan; step two place 4 ounces of strained peas in said pan; step three place 4 ounces of strained garden vegetables in said pan; step four place 4 ounces of strained carrots in said pan; step five place 4 ounces of strained applesauce in said pan; step six place 1 cup of peanut butter in a blender; step seven place 4 hard boiled egg yolks in said blender; step eight place 2 cups of water in said blender; step nine blend said egg yolks and water in said blender; step ten place said blended egg yolks and water into said pan; step eleven mix the contents of said pan; step twelve place 2 cups of shelled sunflower seeds in a blender; step thirteen place 2 cups of water in said blender; step fourteen blend said sunflower seeds and water in said blender; step fifteen place said blended sunflower seeds and water into said pan; step sixteen mix the contents of said pan; step seventeen place 1 cup of dry rice baby cereal in a blender; step eighteen place 1 cup of water in said blender; step nineteen blend said dry rice baby cereal and water in said blender; step twenty place said dry rice baby cereal and water into said pan; step twenty-one mix the contents of said pan; step twenty-two place 1 cup of cooked oatmeal in a blender; step twenty-three place 1 cup of water in said blender; step twenty-four blend said oatmeal and water in said blender; step twenty-five place said oatmeal and water into said pan; step twenty-six mix the contents of said pan; step twenty-seven place 2 cups of cooked cream of wheat in a blender; step twenty-eight place 1 cup of water in said blender; step twenty-nine blend said cream of wheat and water in said blender; step thirty place said cream of wheat and water into said pan; step thirty-one mix the contents of said pan; step thirty-two heat the contents of said pan while stirring; step thirty-three cook for 6 minutes and keep stirring so it doesn't lump; step thirty-four let contents cool to room temperature; and then step thirty-five place the contents in containers & freeze in 4 day feeding servings. Do not feed after 4 days. Keep formula you are feeding refrigerated.

The peanut butter is creamy peanut butter. The egg yolks are from hard boiled eggs. The sunflower seeds are raw shelled sunflower seeds. The oatmeal is cooked oatmeal. The cream of wheat is cooked cream of wheat.

What is claimed is new and desired to be protected by Letters Patent is set forth in the appended claims:

1. A method for making bird food for feeding young birds comprising the steps of:
   i. placing 4 ounces of strained green beans in a pan;
   ii. placing 4 ounces of strained peas in said pan;
   iii. placing 4 ounces of strained garden vegetables in said pan;
   iv. placing 4 ounces of strained carrots in said pan;
   v. placing 4 ounces of strained applesauce in said pan
   vi. placing 1 cup of creamy peanut butter in a blender;
   vii. placing 4 egg yolks from hard boiled eggs in said blender;
   viii. placing 2 cups of water in said blender;
   ix. blending said egg yolks and water in said blender;
   x. placing said blended egg yolks and water into said pan;
   xi. mixing the contents of said pan;
   xii. placing 2 cups of shelled sunflower seeds in a blender;
   xiii. placing 2 cups of water in said blender;
   xiv. blending said sunflower seeds and water in said blender;
   xv. placing said blended sunflower seeds and water into said pan;
   xvi. mixing the contents of said pan;
   xvii. placing 1 cup of dry rice baby cereal in a blender;
   xviii. placing 1 cup of water in said blender;
   xix. blending said dry rice baby cereal and water in said blender;
   xx. placing said dry rice baby cereal and water into said pan;
   xxi. mixing the contents of said pan;
   xxii. placing 1 cup of cooked oatmeal in a blender;
   xxiii. placing 1 cup of water in said blender;

xxiv. blending said oatmeal and water in said blender;
xxv. placing said oatmeal and water into said pan;
xxvi. mixing the contents of said pan;
xxvii. placing 2 cups of cooked cream of wheat in a blender;
xxviii. placing 1 cup of water in said blender;
xxix. blending said cream of wheat and water in said blender;
xxx. placing said cream of wheat and water into said pan;
xxxi. mixing the contents of said pan;
xxxii. heating the contents of said pan while stirring;
xxxiii. cooking for 6 minutes;
xxxiv. cooling the contents of the pan to room temperature;
xxxv. placing the cooled contents in a least one container; and
xxxvi. freezing the contents in the container.

\* \* \* \* \*